US012339691B2

(12) United States Patent
Conte et al.

(10) Patent No.: US 12,339,691 B2
(45) Date of Patent: Jun. 24, 2025

(54) LOW DROP-OUT REGULATOR CIRCUIT, CORRESPONDING DEVICE AND METHOD

(71) Applicant: STMICROELECTRONICS S.r.l., Agrate Brianza (IT)

(72) Inventors: Antonino Conte, Tremestieri Etneo (IT); Marco Ruta, San Gregorio di Catania (IT); Francesco Tomaiuolo, Acireale (IT); Michelangelo Pisasale, Catania (IT); Marion Helne Grimal, Catania (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 281 days.

(21) Appl. No.: 18/295,774

(22) Filed: Apr. 4, 2023

(65) Prior Publication Data

US 2023/0333583 A1 Oct. 19, 2023

(30) Foreign Application Priority Data

Apr. 14, 2022 (IT) ........................ 102022000007505

(51) Int. Cl.
*G05F 1/59* (2006.01)
*G05F 1/575* (2006.01)

(52) U.S. Cl.
CPC ................ *G05F 1/59* (2013.01); *G05F 1/575* (2013.01)

(58) Field of Classification Search
CPC .................................. G05F 1/59; G05F 1/575
See application file for complete search history.

(56) References Cited

U.S. PATENT DOCUMENTS 7,683,592 B2 * 3/2010 Soude ..................... G05F 1/575 323/275
2012/0146595 A1 * 6/2012 Wong ........................ G05F 1/56 323/265

(Continued)

FOREIGN PATENT DOCUMENTS

WO WO 2020053879 A1 3/2020

OTHER PUBLICATIONS

Tang et al., "A 0.7V Fully-on-Chip Pseudo-Digital LDO Regulator with 6.3 µA Quiescent Current and 100mV Dropout Voltage in 0.18 µm CMOS," ESSCIRC 2018—IEEE 44th European Solid State Circuits Conference (ESSCIRC), Dresden, Germany, 2018, pp. 206-209.

(Continued)

*Primary Examiner* — Jue Zhang
*Assistant Examiner* — Lakaisha Jackson
(74) *Attorney, Agent, or Firm* — Seed IP Law Group LLP

(57) ABSTRACT

A LDO regulator circuit comprises an input comparator and driver circuitry including transistors having a current flow path therethrough coupled to an output node of the regulator. First and second driver each comprises: driver transistors having the current flow paths therethrough coupled to the output node, capacitive boost circuitry that applies to the drive transistors a voltage-pumped replica of the comparison signal. Voltage refresh transistor circuitry coupled to the capacitive boost circuitry transfer thereon the voltage-pumped replica. The first and second drivers can be controllably switched between a first mode of operation, during which the current flow path through the driver transistors is conductive or non-conductive based on the voltage-pumped replica of the comparison signal, and a second mode, during which the voltage refresh transistor circuitry is activated to transfer the voltage-pumped replica of the comparison sig- (Continued)

nal, and the current flow path through the driver transistors is non-conductive.

20 Claims, 6 Drawing Sheets

(56) References Cited

U.S. PATENT DOCUMENTS

| | | | | |
|---|---|---|---|---|
| 2017/0242449 | A1* | 8/2017 | Chen | G05F 1/575 |
| 2019/0050012 | A1* | 2/2019 | Yang | G05F 1/575 |
| 2020/0144913 | A1 | 5/2020 | Harjani et al. | |
| 2022/0035393 | A1* | 2/2022 | Hafizi | G05F 1/59 |

OTHER PUBLICATIONS

Wang et al., "A Dynamically High-Impedance Charge-Pump-Based LDO With Digital-LDO-Like Properties Achieving a Sub-4-fs FoM," *IEEE Journal of Solid-State Circuits* 55(3):719-730, Mar. 2020.

* cited by examiner

LOW DROP-OUT REGULATOR CIRCUIT, CORRESPONDING DEVICE AND METHOD

BACKGROUND

Technical Field

The present disclosure relates to low drop-out (LDO) regulators and LDO regulators in battery-operated products such as portable devices of small size.

Description of the Related Art

The designation low drop-out (LDO) regulator denotes a DC voltage regulator capable of regulating an output voltage even if the input or supply voltage lies in the vicinity of the output voltage.

LDO regulators are widely used for industrial and automotive applications. The increasing demand for portable and battery-operated products have forced these circuits to operate over a wide range of supply voltage and multi-voltage platforms. As a consequence, standby and quiescent current flow are major concerns considering also that these regulators are expected to operate in a wide temperature range (−40° C. to 125° C., typically).

BRIEF SUMMARY

According to one or more embodiments, a circuit is provided.

One or more embodiments relate to a corresponding device.

A portable, battery-operated product of small size for consumer or professional electronics is exemplary of such a device.

One or more embodiments relate to a corresponding method.

In examples presented herein an on/off output stage is used for an LDO driven with a propagation time of few hundreds of picoseconds thanks to the use of a cascoded structure. This is driven by shifting capacitors refreshed in a way that allows a response that is completely uncorrelated to the refresh clock frequency. A level shifter and a charge pump of conventional type are no longer needed for such an arrangement.

Examples presented herein adopt an output driver having a response time comparable with the response time of a low-voltage (LV) comparator; a corresponding LDO will thus exhibit an improved response time.

Examples presented herein involve voltage shifting that takes place thanks to a pulse on the bottom plate of a charged capacitor. Short pulses of the LV comparator are not filtered, which improves the efficiency of the LDO.

Examples presented herein include a (very) small boost pump: this is used only to refresh small boost capacitors and not the gate of an output driver; area and current consumption are reduced because inefficiency introduced by a small pump is negligible.

Examples presented herein include two drivers that are symmetrical and work in alternance: when one driver is in a pulsing phase the other driver is in a refreshing phase and vice-versa. An overlapped phase is contemplated in which both drivers are pulsing, to facilitate continued regulation.

Examples presented herein include a phase generator that, starting from a refreshing clock, generates signals to manage different operation phases of the main drivers.

In examples as presented herein, the response time of the output driver is comparable with the response time of a low-voltage (LV) comparator; the LDO will thus exhibit improved response time performance.

BRIEF DESCRIPTION OF THE SEVERAL VIEWS OF THE DRAWINGS

One or more embodiments will now be described, by way of example only, with reference to the annexed figures, wherein.

Unless otherwise indicated, corresponding numerals and symbols in the different figures generally refer to corresponding parts.

Also, throughout this description, a same designation may be used for brevity to designate:

- a certain node or line as well as a signal occurring at that node or line, and
- a certain component (e.g., a capacitor or a resistor) as well as an electrical parameter thereof (e.g., capacitance or resistance/impedance).

DETAILED DESCRIPTION

In the ensuing description, various specific details are illustrated in order to provide an in-depth understanding of various examples of embodiments according to the description. The embodiments may be obtained without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment," "in one embodiment," or the like, that may be present in various points of the present description do not necessarily refer exactly to one and the same embodiment. Furthermore, particular configurations, structures, or characteristics may be combined in any adequate way in one or more embodiments.

The headings/references used herein are provided merely for convenience and hence do not define the extent of protection or the scope of the embodiments.

As noted in the introduction to this description, low drop-out (LDO) regulators are now widely used for industrial and automotive applications.

In devices such as portable and battery-operated products, a growing demand exists for LDO regulators capable of operating over a wide range of supply voltages, e.g., in multi-voltage platforms: values such as vcc [1.6V-3.6V] and vdd [0.8V-1.15V] are exemplary of possible desired operating domains or ranges. Standby and quiescent current flows become significant parameters, especially for devices expected to operate over wide temperature ranges (−40° C. to 125° C., for instance.

Figure 1:
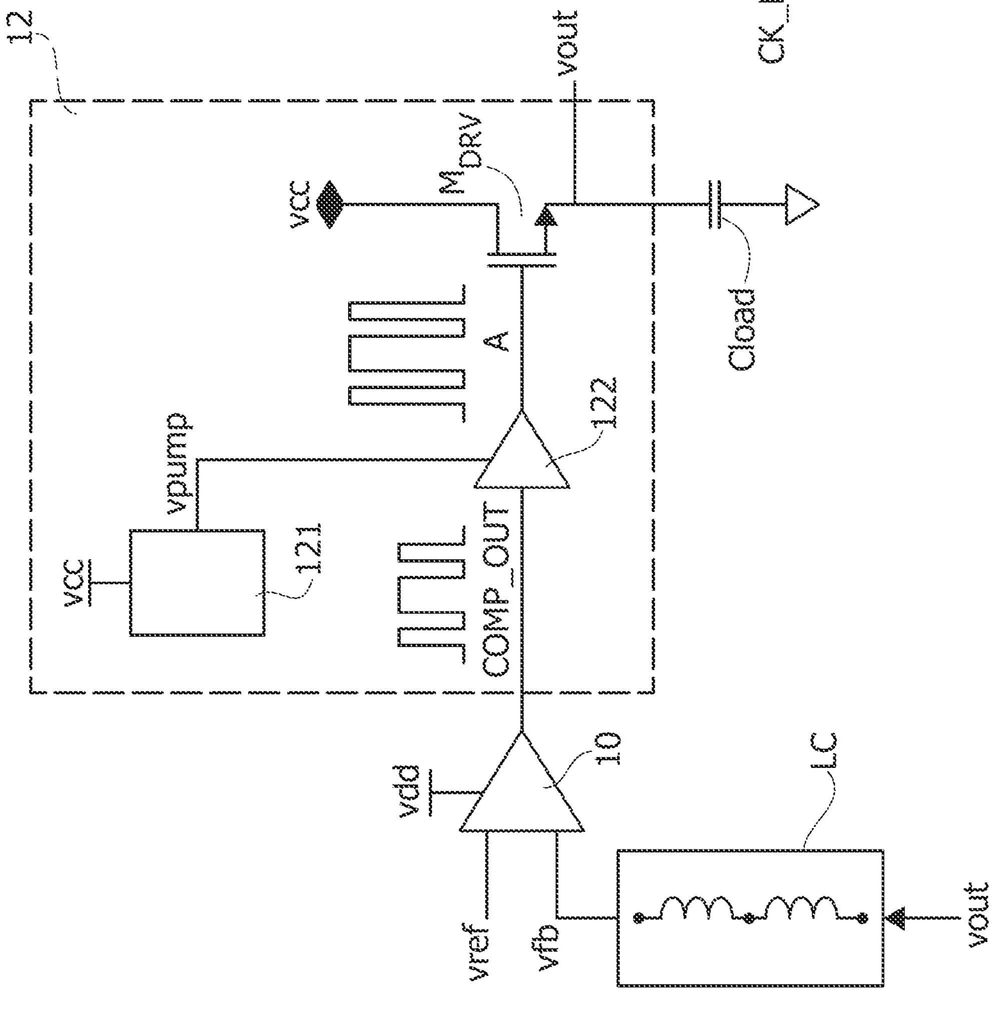
FIG. 1 is a circuit diagram of a conventional low drop-out (LDO) regulator.

So called on-off LDO regulators are circuits (integrated circuits or ICs, for instance) designed with the aim of providing (e.g., fixed) output voltages for varying loads with minimal voltage dropout and (very) fast response time FIG. 1 is a circuit diagram of a conventional on-off, high-speed, low drop-out (LDO) regulator capable of operating over a multi-voltage range vcc [1.6V-3.6V] and vdd [0.8V-1.15V](these values are merely exemplary).

The LDO regulator of FIG. 1 comprises a comparator (error amplifier) 10 supplied at a voltage vdd and configured to compare a (feedback) voltage vfb with a stable reference voltage vref (a bandgap reference, for instance). The voltage vfb is derived via a loop control network LC from the output voltage vout (e.g., as a fraction of the output voltage sensed via a voltage divider).

The comparator 10 can be implemented with low-voltage transistors to facilitate achieving a fast response time. This results in the output from the comparator 10 being a low-voltage signal COMP_OUT that is applied to an output driver 12.

The output driver 12 is supplied at a voltage vcc to produce a regulated voltage when a large amount of current is desired to be applied at an output node vout to a (e.g., capacitive) load Cload.

The output driver 12 comprises a voltage pump supplied at the voltage vcc and configured to generate a (fixed) voltage signal vpump (e.g., 3.6V).

A level shifter 122 shifts the low-voltage signal COMP_OUT (e.g., [0, vdd]) from the comparator 10 to the voltage vpump (e.g., [0, vpump]) that controls (at a node A) switching of an output transistor $M_{DRV}$.

If the output voltage vout becomes higher than desired relative to the reference voltage, the regulator drives the power transistor $M_{DRV}$ in such a way to maintain a constant output voltage vout.

Structure and operation of a LDO regulator as illustrated in FIG. 1 are well known to those of skill in the art, which makes it unnecessary to provide a more detailed description herein.

The output driver $M_{DRV}$ can be implemented with a high-voltage (HV) transistor (a MOSFET transistor, for instance, having its gate coupled to the node A and the source-drain current flow path therethrough included in a current flow line between a node at the voltage vcc and the load Cout (output node vout).

The transistor $M_{DRV}$ is chosen big enough to facilitate achieving largest (max) current for a regulated output voltage vout (e.g., 1.5V).

It is again noted that the quantitative data mentioned herein are merely exemplary and non-limiting.

Having a high output current for the transistor $M_{DRV}$ involves selecting for $M_{DRV}$ a "big" transistor with a correspondingly high gate capacitance.

The low-voltage comparator 10 provides a (very) fast response time so that the signal COMP_OUT has a correspondingly high switching frequency. A conventional arrangement as illustrated in FIG. 1 thus suffers from a number of drawbacks.

For instance, the response time of the level shifter 122 may not be fast enough to follow adequately the variations of the signal COMP_OUT, thus giving rise to an undesired (low-pass) filtering action of short pulses in the signal COMP_OUT.

The level shifter 122 may also introduce a delay on its commutation (switching) and this reduces the response time of the output driver $M_{DRV}$ and the response time of the LDO regulator as a whole.

The pump 121 is expected to be able to supply a current of high intensity to keep up with commutations in the level shifter 122 and to drive the (large) gate capacitance of the output driver $M_{DRV}$. As a result, the pump 121 may introduce a current inefficiency into the system; also, using a big pump 121 results in considerable area consumption.

By way of contrast, examples as discussed herein (see FIG. 3, for instance) comprise two drivers, 12A (DRIVER A) and 12B (DRIVER B), conceived as symmetrical parts that operate on the signal COMP_OUT from the comparator mainly in an alternate manner: when one driver is in a pulsing phase the other driver is in a refreshing phase, and vice versa.

Referring to operation being "mainly" in an alternate manner takes into account that, as discussed in the following, an overlapped or overlapping phase can be contemplated in which both drivers are pulsing, to facilitate continued regulation.

The drivers 12A and 12B as discussed herein are configured to co-operate within the framework of a LDO regulator that comprises:

- a comparator 10 (essentially as illustrated in FIG. 1) supplied at a voltage vdd and configured to compare a (feedback) voltage vfb with a reference voltage vref,
- a phase generator 100A that, starting from a refreshing clock CK_REFRESH, generates various drive signals PA_LV, PB_LV, PA, PB to manage different operation phases of the drivers DRIVER A and DRIVER B, and
- a boost pump 100B: this is a small charge pump that, starting from the signal vout and the signals PA, PB generates a "boosted" output voltage vbl_boost=vdd+vout plus various other signals PA_TOP_ana, PA_BST_TOP_ana, PB_TOP_ana, PB_BST_TOP_ana to drive the drivers DRIVER A and DRIVER B as discussed in the following.

Figure 2:
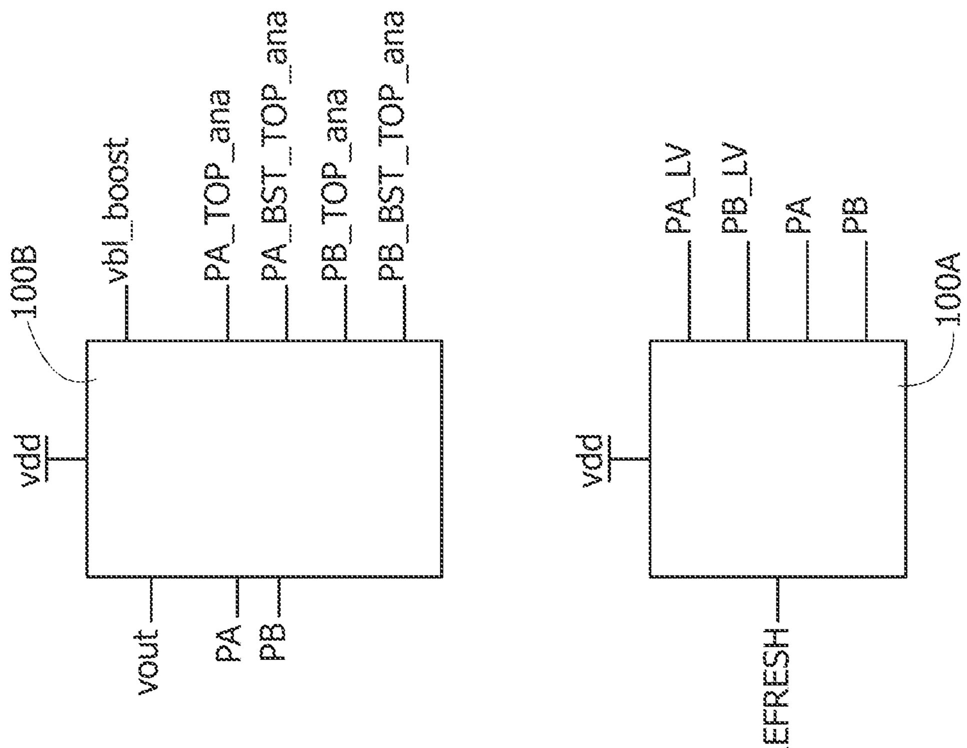
FIG. 2 represents a boost pump and a phase generator for use in a circuit as discussed herein.

The phase generator 100A and the boost pump 100B are illustrated in FIG. 2 as mutually distinct elements that are also distinct from the drivers 12A and 12B; this is merely by way of example in so far as in certain examples these elements can be mutually integrated and/or integrated with the drivers 12A and 12B.

The phase generator 100A and the boost pump 100B can be implemented a manner known per se to those of skill in the art (e.g., the phase generator 100A can be implemented as a finite state machine—FSM) based on the explanations provided in the following.

Figure 3:
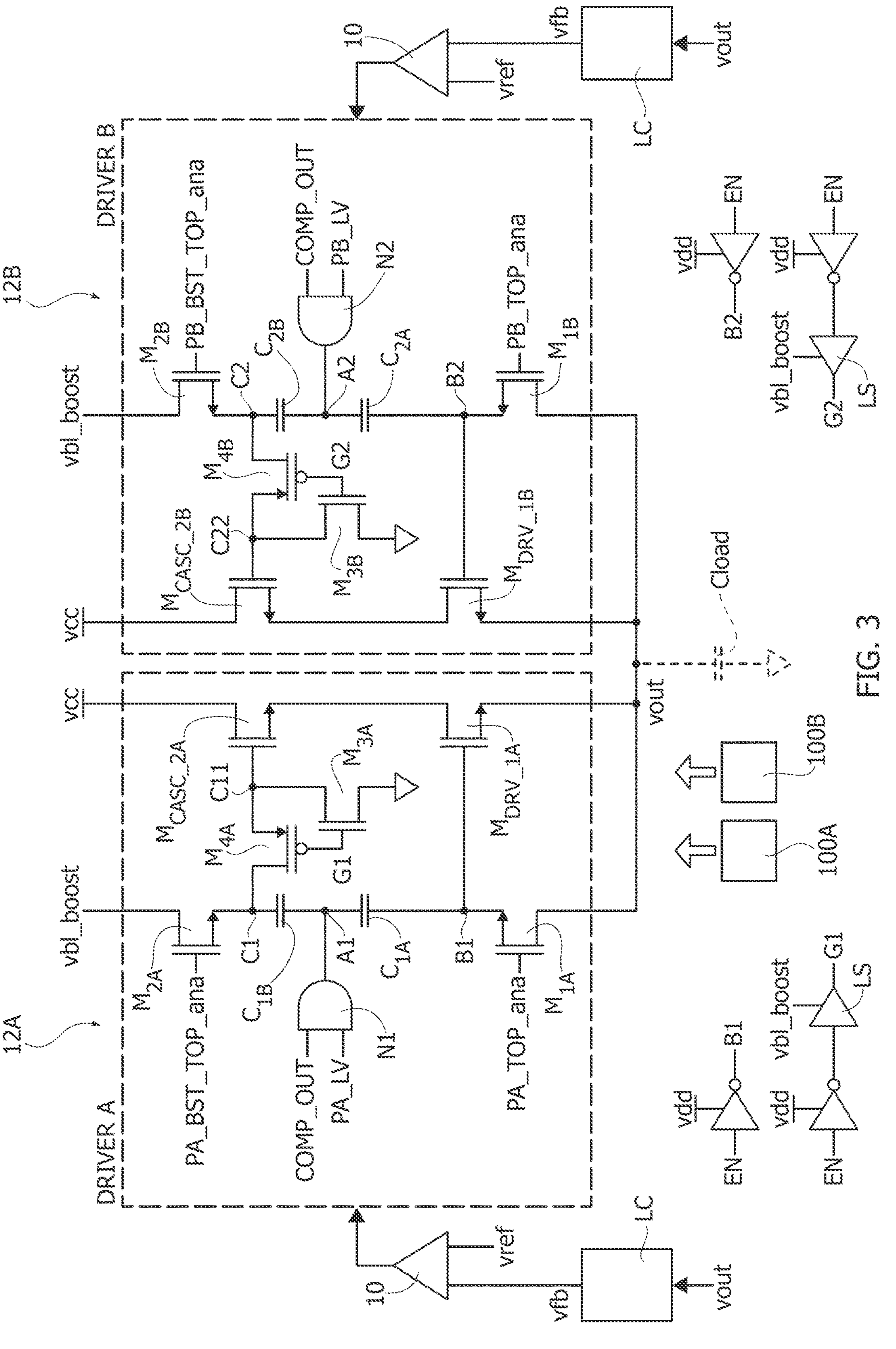
FIG. 3 is diagram exemplary of a circuit as discussed herein.

The full LDO regulator combination of the comparator 10 (indicated twice at the nodes where the signal COMP_OUT is injected into the drivers 12A and 12B), the phase generator 100A and the boost pump 100B is illustrated only in FIG. 3. FIGS. 4 to 7 focus on the driver architecture intended to produce the signal vout applied to the load Cout starting from the signal COMP_OUT from the comparator 10.

As illustrated in FIGS. 3 to 7, the drivers 12A (DRIVER A) and 12B (DRIVER B) are symmetrical.

The references 12A and 12B are intended to highlight the fact that the drivers 12A and 12B are intended to play a role similar to the role of the output driver 12 of FIG. 1 in producing an output voltage vout starting from the low-voltage signal COMP_OUT from the comparator 10.

FIGS. 3 to 7 herein are illustrative of a field-effect (MOSFET) implementation of the drivers 12A and 12 B.

At least in principle, a bipolar junction transistor (BJT) implementation of the circuits discussed in the present description is likewise possible. In such a BJT implementation, the control terminal will be the base of these transistors (in the place of the gate for a field-effect transistor)

and the current path therethrough will be represented by the emitter-collector current flow path (in the place of source-drain current flow path for a field-effect transistor).

FIGS. 3 to 7 are illustrative of an implementation of the drivers 12A and 12B where voltages such a vcc or vdd are assumed to be positive voltages, with the polarities of the transistors (e.g., p-channel/n-channel MOSFETs) selected correspondingly. Those of skill in the art can easily devise corresponding adaptations of polarities in case voltages such as vcc or vdd are negative voltages.

Considering the driver 12A (DRIVER A) first, references MCASC_2A and MDRV_1A denote two transistors (two MOSFET transistors, for instance) arranged with the current flow paths therethrough (source-drain in the case of a field-effect transistor such as a MOSFET transistor) cascaded between a node at voltage vcc and the output node or line vout (this is common to the two drivers 12A and 12B and intended to be connected to a load such as, e.g., a capacitive load Cload: see also FIG. 1).

MDRV_1A is the main driver transistor and can be chosen as a low-voltage (LV) transistor.

In an implementation as illustrated, the source of the transistor MDRV_1A is coupled to the output node vout and the gate coupled to anode B1 to be pulsed (shifted) from vout to vout+vdd when a pulse in the signal COMP_OUT comes from the comparator 10.

As noted, throughout this description, a same designation (e.g., vout, vdd) is used for brevity to designate a certain node or line as well as a signal occurring at that node or line.

Reference vout thus denotes the regulated voltage and vdd is a low voltage supply ([0.8V, 1.15V], for instance: the quantitative values provided throughout this description are merely exemplary and non-limiting).

The transistor MCASC_2A is a high-voltage (HV) transistor (MOSFET, for instance) that facilitates obtaining a cascoded signal on the drain of the transistor MDRV_1A to facilitate protection thereof in various operating conditions.

The control electrode (gate, in the case of a field-effect transistors such as a MOSFET) C1 is pulsed (shifted) from vout+vdd to vout+2vdd when a pulse in the signal COMP_OUT comes from the comparator 10.

As illustrated herein, the transistors MDRV_1A and MCASC_2A are "on" (conductive) during a pulsing phase as discussed in the following.

References C1A and C1B denote boost capacitors that are refreshed, during a refreshing phase, to bring the node B1 to vout and a node C1 to vbl_boost=vout+vdd.

The nodes C1 and B1 are arranged in a current flow line between a node at a voltage vbl_boost (from the boost pump 100B of FIG. 2) and the output node vout, the current flow line including the cascaded arrangement of:

- a current flow path (source-drain in the case of a field-effect transistor such as a MOSFET) through a transistor M2A arranged between the node at voltage vbl_boost and the node C1,
- the capacitor C1B between the node C1 and a node A1;
- the capacitor C1A between the node A1 and the node B1;
- a current flow path (source-drain in the case of a field-effect transistor such as a MOSFET) through a transistor M1A arranged between the node B1 and the output node vout.

The transistors M1A and M2A are used to refresh the capacitor C1A (node B1) and capacitor C1B (node C1).

The control electrodes (gates in the case of field-effect transistors such as a MOSFET) of the transistors M1A and M2A receive from the boost pump 100B signals PA_TOP_ana and PA_BST_TOP_ana (at values vout+vdd and vout+2vdd, respectively) to switch on (make conductive) the two transistors M1A and M2A during refreshing phases as discussed in the following.

References M3A and M4A denote two further transistors (MOSFETs, for instance) arranged with:

- the current flow-path (here, source-drain) through the transistor M3A between the control electrode (here, gate) C11 of the cascode transistor MCASC_2A and a reference node (ground, for instance), and
- the current flow-path (here, source-drain) through the transistor M4A between the nodes C1 and C11 and the control electrode (here, gate) G1 coupled to the control electrode (here, gate) of the transistors M3A.

The transistors M3A, M4A (n-channel and p-channel) are used to disconnect the node C11 from the node C1 and put it to ground in when the regulator, and so the output driver, is OFF (EN=0). In OFF condition the nodes B1 and C11 are grounded An AND gate N1 provides gating of the signal COMP_OUT from the comparator 10 via a signal PA_LV that is "0" in a refreshing condition (so that the signal COMP_OUT is don't care) and '1' in a pulsing condition.

The bottom portion of FIG. 3 (and FIGS. 4 to 7 as well) provides—by way of immediate reference—an exemplary presentation of how the signals at nodes B1 and G1 can be obtained (asserted) based on a general enable signal EN, via an inverter referred to the node vdd (signal at the node B1) and via the cascaded arrangement of an inverter referred to the node vdd and a level shifter LS (of any known type for that purpose) referred to the node vdd_boost from the boost pump 100B of FIG. 2 (signal at the node G1).

Considering now the driver 12B (DRIVER B), references MCASC_2B and MDRV_1B denote two transistors (two MOSFET transistors, for instance) arranged with the current flow paths therethrough (source-drain in the case of a field-effect transistor such as a MOSFET transistor) cascaded between the node at voltage vcc and the output node or line vout (as noted, this is common to the two drivers 12A and 12B).

MDRV_1B is the main driver transistor and can be chosen as a low-voltage (LV) transistor.

In an implementation as illustrated, the source of the transistor MDRV_1B is coupled to the output node vout and the gate coupled to a node B2 to be pulsed (shifted) from vout to vout+vdd when a pulse in the signal COMP_OUT comes from the comparator 10.

The transistor MCASC_2B is a high-voltage (HV) transistor (MOSFET, for instance) that facilitates obtaining a cascoded signal on the drain of the transistor MDRV_1B to facilitate protection thereof in various operating conditions.

The control electrode (gate, in the case of a field-effect transistors such as a MOSFET) C2 is pulsed (shifted) from vout+vdd to vout+2vdd when a pulse in the signal COMP_OUT comes from the comparator 10.

As illustrated herein, the transistors MDRV_1B and MCASC_2B are "on" (conductive) during a pulsing phase as discussed in the following.

References C2B and C2A denote boost capacitors that are refreshed, during a refreshing phase, to bring the node B2 to vout and a node C2 to vbl_boost=vout+vdd.

The nodes C2 and B2 are arranged in a current flow line between the node at a voltage vbl_boost (from the boost pump 100B of FIG. 2) and the output node vout, the current flow line including the cascaded arrangement of:

a current flow path (source-drain in the case of a field-effect transistor such as a MOSFET) through a transistor M2B arranged between the node at voltage vbl_boost and the node C2, the capacitor C2B between the node C2 and a node A2;

the capacitor C1B between the node A2 and the node B2;

a current flow path (source-drain in the case of a field-effect transistor such as a MOSFET) through a transistor M1B arranged between the node B2 and the output node vout.

The transistors M1B and M2B are used to refresh the capacitor C2A (node B2) and capacitor C2B (node C2).

The control electrodes (gates in the case of field-effect transistors such as a MOSFET) of the transistors M1B and M2B receive from the boost pump 100B signals PB_TOP_ana and PB_BST_TOP_ana (at values vout+vdd and vout+2vdd, respectively) to switch on (make conductive) the two transistors M1B and M2B during refreshing phases as discussed in the following.

References M3B and M4B denote two further transistors (MOSFETs, for instance) arranged with:

the current flow-path (here, source-drain) through the transistor M3B between the control electrode (here, gate) C22 of the cascode transistor MCASC_2B and a reference node (ground, for instance), and the current flow-path (here, source-drain) through the transistor M4B between the nodes C2 and C22 and the control electrode (here, gate) G1 coupled to the control electrode (here, gate) of the transistors M3B.

The transistors M3B, M4B (n-channel and p-channel) are used to disconnect the node C22 from the node C2 and put it to ground in when the regulator, and so the output driver, is OFF (EN=0). In OFF condition the nodes B2 and C22 are grounded.

An AND gate N2 provides gating of the signal COMP_OUT from the comparator 10 via a signal PB_LV that is "0" in a refreshing condition (so that the signal COMP_OUT is don't care) and '1' in a pulsing condition.

The bottom portion of FIG. 3 (and FIGS. 4 to 7 as well) provides—by way of immediate reference—an exemplary presentation of how the signals at nodes B2 and G2 can be obtained (asserted) based on a general enable signal EN, via an inverter referred to the node vdd (signal at the node B2) and via the cascaded arrangement of an inverter referred to the node vdd and a level shifter LS (of any known type for that purpose) referred to the node vdd_boost from the boost pump 100B of FIG. 2 (signal at the node G2).

FIGS. 4 to 7 are exemplary of (mainly alternate) operation of the drivers 12A and 12B as controlled via the signals PA_LV, PB_LV, PA, PB from the phase generator 100A of FIG. 2.

Labels ON and OFF FIGS. 4 to 7 indicate the conductive/non-conductive state of the related transistors and the logical state ("0" or "1") of certain nodes is indicated for immediate reference.

Figure 4:
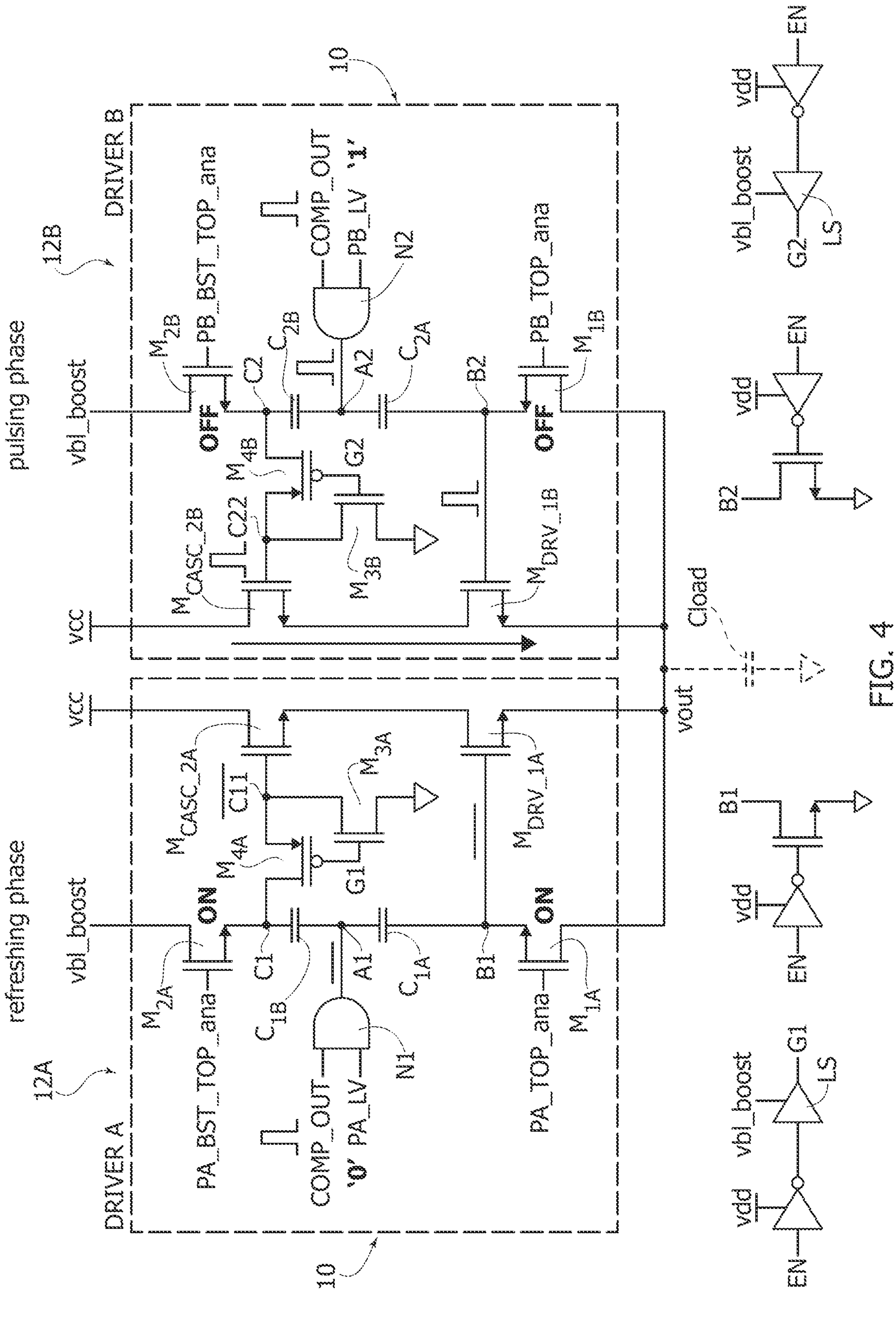
FIGS. 4 to 7 are illustrative of possible operating conditions of a circuit according to the diagram of FIG. 3.

FIG. 4 is exemplary of the behavior of the drivers 12A and 12B in an "on" condition where:

the driver 12B is in a pulsing phase with the transistors MDRV_1B and MCASC_2B switched ON/OFF depending on the value of the signal COMP_OUT from the comparator 10, and the driver 12A is in refreshing phase with the boost capacitors C1A and C1B charged through the transistors M1A and M2A.

During the pulsing phase of the driver 12B:

the signal COMP_OUT from the comparator 10 (switching between gnd and vdd) is propagated through the AND gate N2 (due to PB_LV being "1"), the node C22 switches between vout+vdd and vout+2vdd, and the node B2 switches between vout and vout+vdd.

Figure 5:
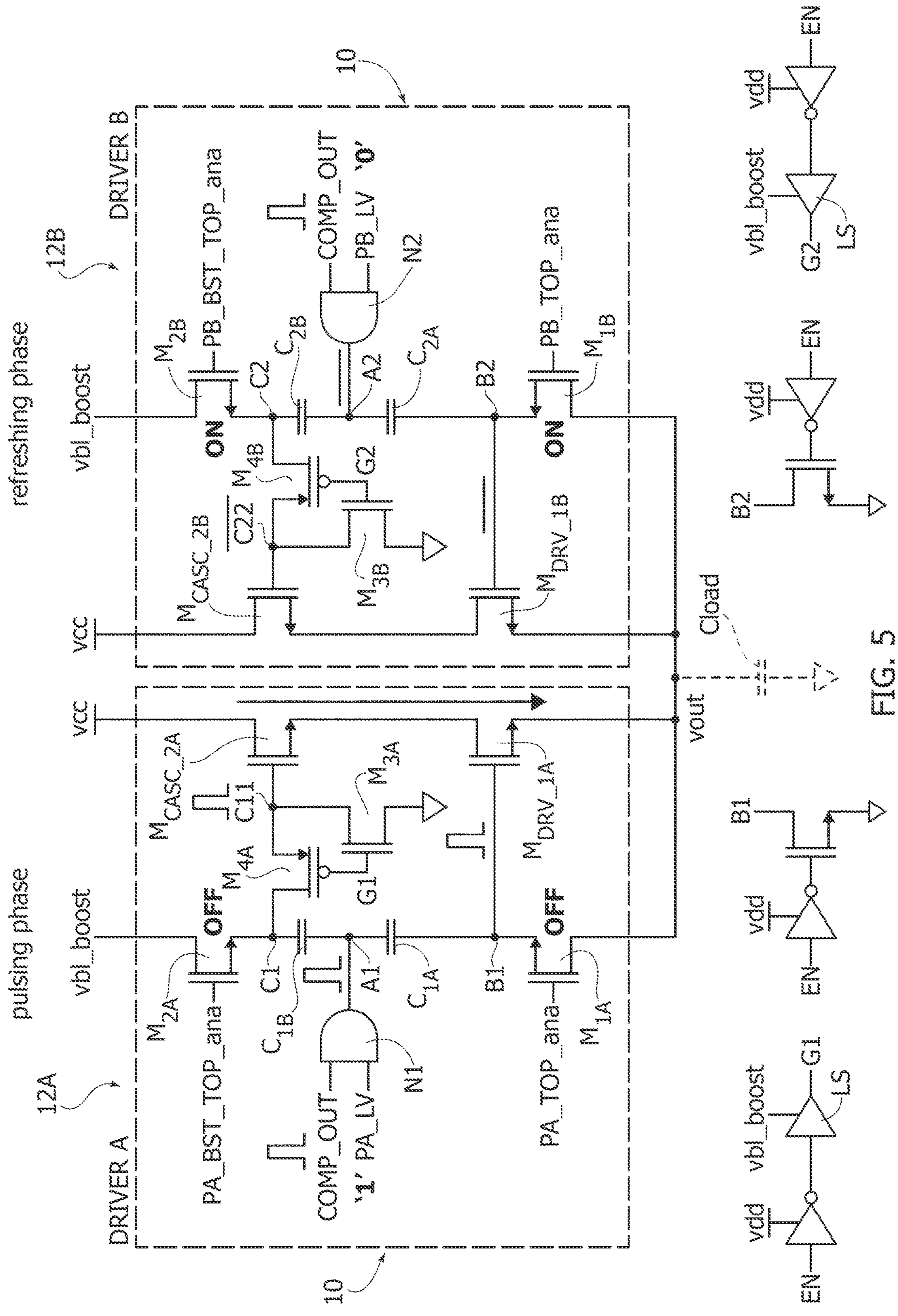

During the refreshing phase of the driver 12A:

the node A1 is grounded (even if the signal COMP_OUT is pulsed between ground and vdd, due to LA_LV being "0"), the node B1 brought to vout, the gates of the transistors M1A and M2A are boosted respectively by PA_TOP_ana→vout+vdd and PA_BST_TOP_ana→(vout+vdd)+vdd FIG. 5 is exemplary of the behavior of the drivers 12A and 12B in a complementary "on" condition where:

the driver 12A is in a pulsing phase with the transistors MDRV_1A and MCASC_2A switched ON/OFF depending on the value of the signal COMP_OUT from the comparator 10, and the driver 12B is in refreshing phase with the boost capacitors C2A and C2B charged through the transistors M1B and M2B.

During the pulsing phase of the driver 12A:

the signal COMP_OUT from the comparator 10 (switching between gnd and vdd) is propagated through the AND gate N1 (due to PA_LV being "1"), the node C11 switches between vout+vdd and vout+2vdd, and the node B1 switches between vout and vout+vdd.

Figure 6:
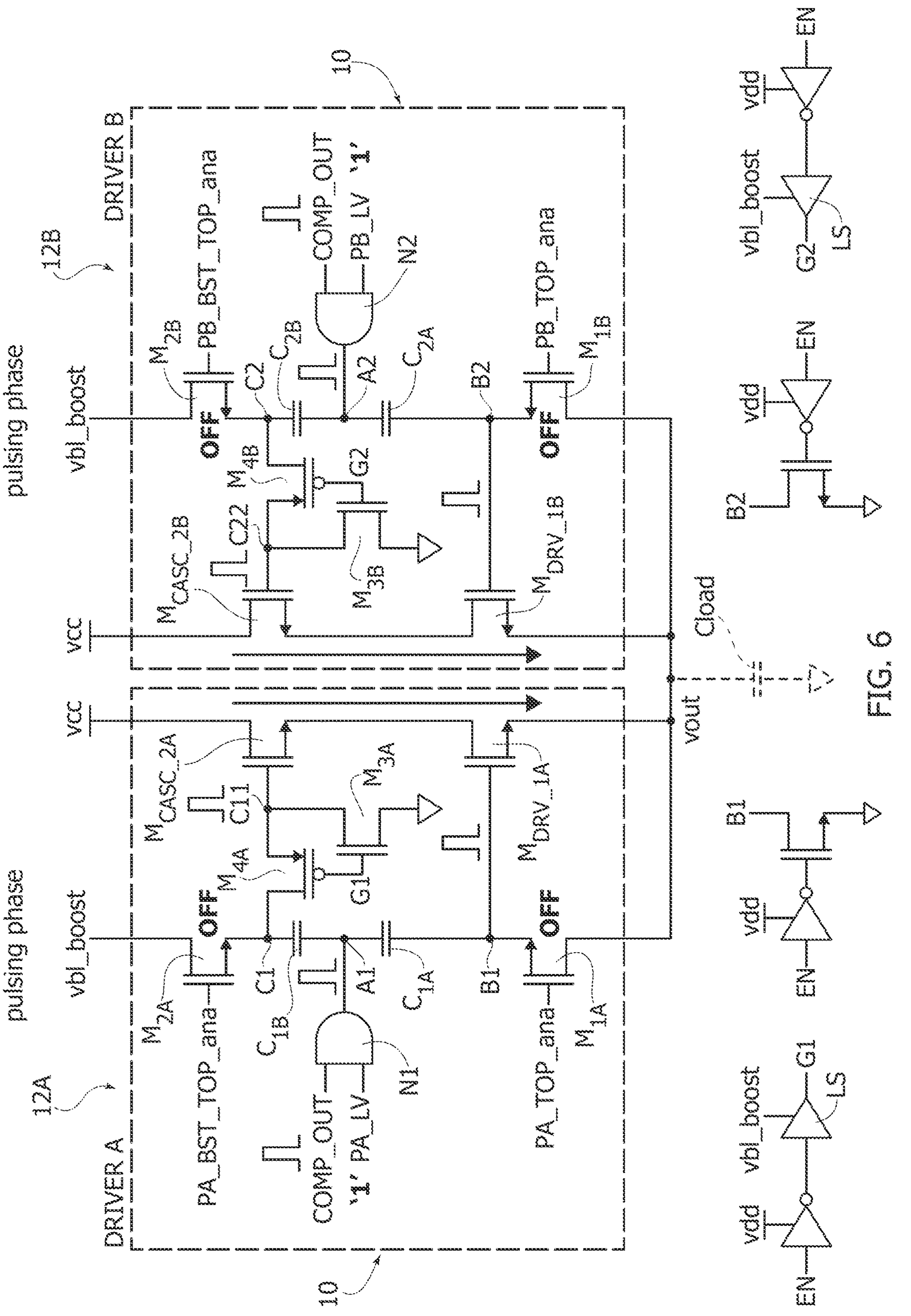

During the refreshing phase of the driver 12B:

the node A2 is grounded (even if the signal COMP_OUT is pulsed between ground and vdd, due to PB_LV being "0"), the node 21 brought to vout, the gates of the transistors M1B and M2B are boosted respectively by PB_TOP_ana→vout+vdd and PB_BST_TOP_ana→(vout+vdd)+vdd In order to facilitate adequate regulation during the alternate switching of the drivers 12A and 12B between the refreshing phase and the pulsing phase (transition from FIG. 4 to FIG. 5 and from FIG. 5 to FIG. 4), the phase signals (essentially LA_LV and PB_LV) are controlled by the phase generator 100A is such a way to temporarily to force both drivers 12A and 12B in a pulsing condition as represented in FIG. 6.

The period in which both drivers are ON (pulsing) is (very) small, e.g., a fraction of the "on" time for the signal COMP_OUT from the comparator 10. This was found to be adequate in providing continuity in the regulation as desired.

A refreshing frequency of about 5 MHz was likewise found to be adequate in providing satisfactory operation of the circuit as exemplified herein.

Assuming, by way of example, that transition takes place from a condition where the driver 12B is in a pulsing mode and the driver 12A is in a refreshing mode (that is, a condition as illustrated in FIG. 4) a possible phase sequence of the signals to facilitate a satisfactory transition may be as follows:

the transistors M1A and M2A are switched OFF→refreshing on the driver 12A is discontinued, the signal PA_LV is switched ON ("1")→the driver 12A is set in a pulsing mode so that both drivers 12A and 12B are in pulsing mode, the signal PB_LV is switched OFF ("0")→pulsing mode is discontinued in driver 12B, the transistors M1B and M2B are switched ON (made conductive)→the driver 12B is set to the refresh mode.

Assuming, conversely, that transition takes place from a condition where the driver 12A is in a pulsing mode and the driver 12B is in a refreshing mode (that is, a condition as illustrated in FIG. 5) a possible phase sequence of the signals to facilitate a satisfactory transition may be as follows:

the transistors M1B and M2B are switched OFF→refreshing on the driver 12B is discontinued, the signal PB_LV is switched ON ("1")→the driver 12B is set in a pulsing mode so that both drivers 12A and 12B are in pulsing mode, the signal PA_LV is switched OFF ("0")→pulsing mode is discontinued in driver 12A, the transistors M1B and M2B are switched ON (made conductive)→the driver 12B is set to the refresh mode.

Figure 7:
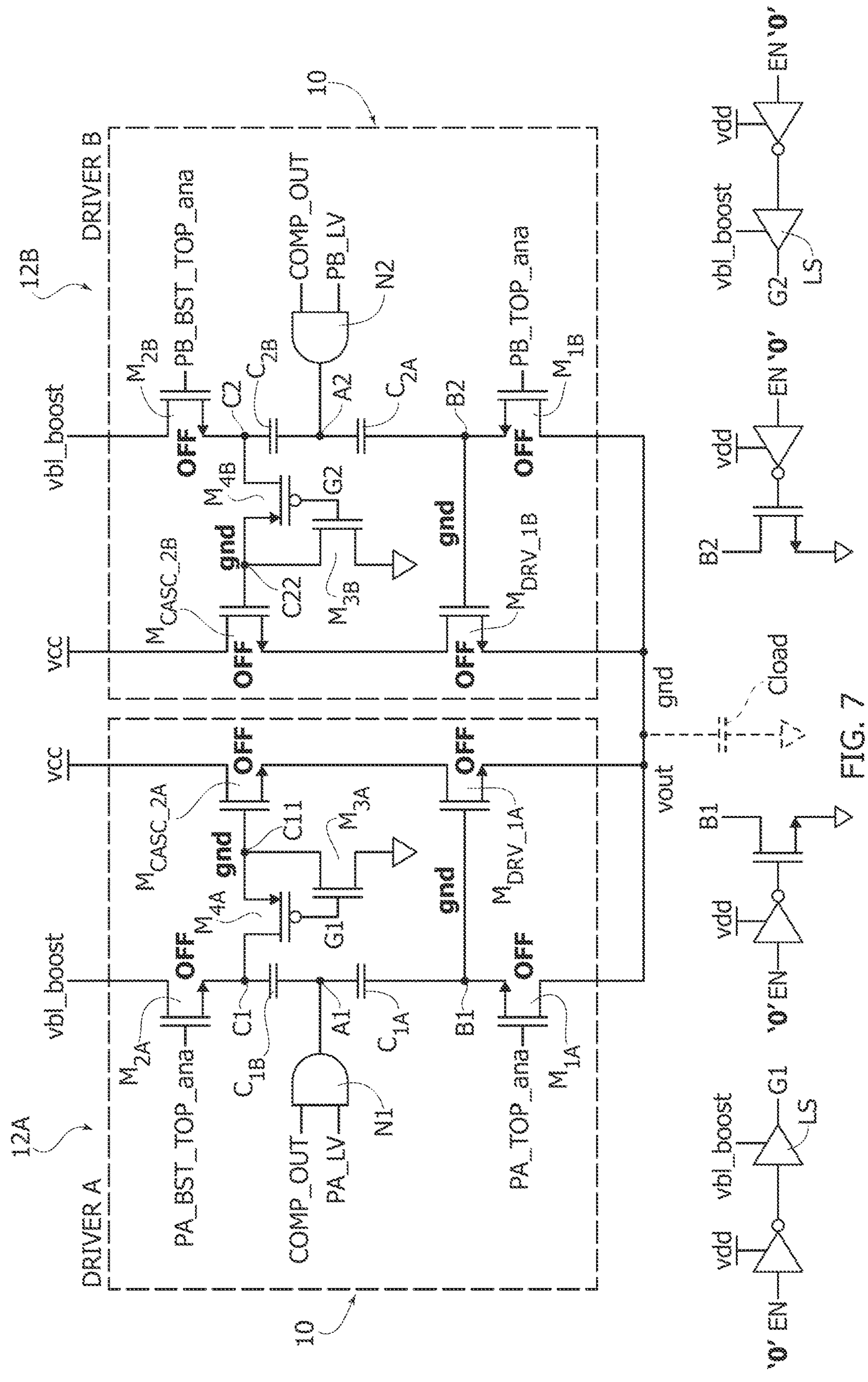

FIG. 7 is representative of the drivers 12A and 12B being brought to an off condition (stand-by, for instance) where having nearly zero current consumption is desirable even if vcc is active (e.g., 3.6V).

In these conditions:

vout set grounded the regulator is turned off, with EN set to "0".

Protection of the low-voltage drivers (MDRV_1A and MDRV_1B) is facilitated by MCASC_2A and MCASC_2B being turned off (non-conductive).

To summarize, architecture as exemplified herein provides the following advantages:

the response time of the output driver circuitry is comparable with the response time of a low-voltage comparator so that LDO performance is improved in terms of response time (voltage shifting takes place via a pulse on the bottom plate of a charged capacitor);

short pulses as provided by the low-voltage comparator 10 are not filtered, which improves the efficiency of the LDO regulator, a (very) small boost pump can be used in so far as the boost pump only refreshes the small boost capacitors and not the gate of output drivers, area consumption is reduced, and current consumption is likewise reduced because inefficiency introduces by a small pump is negligible inefficiency.

Without prejudice to the underlying principles, the details and embodiments may vary, even significantly, with respect to what has been described by way of example only without departing from the extent of protection.

A circuit, may be summarized as including an output node (vout) configured to apply an output voltage to a load (Cload), an input comparator (10) configured to perform a comparison of a reference voltage (vref) and a voltage (vfb) that is a function (LC) of the output voltage and to produce a comparison signal (COMP_OUT) having a first logical value or a second logical value based on the outcome of the comparison, and driver circuitry (12A, 12B) coupled to the input comparator (10) to receive the comparison signal (COMP_OUT) therefrom, the driver circuitry including at least one driver transistor (MDRV_1A, MCASC_2A, MDRV_1B, MCASC_2B) having a current flow path therethrough coupled to the output node (vout) and a control terminal (B1, C1, B2, C2) configured to receive a voltage-pumped (100A; vbl_boost) replica of the comparison signal (COMP_OUT), wherein said replica of the comparison signal (COMP_OUT) has a first respective logical value or a second respective second logical value based on the outcome of the comparison an input comparator (10), wherein the current flow path through the least one driver transistor (MDRV_1A, MCASC_2A, MDRV_1B, MCASC_2B) is conductive or non-conductive in response to the voltage-pumped (100A, vbl_boost) replica of said comparison signal (COMP_OUT) having the first respective logical value or the second respective logical value, wherein the driver circuitry includes a first (12A) and a second (12B) driver coupled to the input comparator (10) to receive the comparison signal (COMP_OUT) therefrom and each of the first (12A) and second (12B) drivers includes at least one driver transistor (MDRV_1A, MCASC_2A, MDRV_1B, MCASC_2B) having a current flow path therethrough coupled to the output node (vout) and a control terminal (B1, C1, B2, C2), voltage boost capacitive circuitry (C1A, C1B, C2A, C2B) configured to apply to the control terminal (B1, C1, B2, C2) of the at least one driver transistor (MDRV_1A, MCASC_2A, MDRV_1B, MCASC_2B) said voltage-pumped (100A; vbl_boost) replica of the comparison signal (COMP_OUT), voltage refresh transistor circuitry (M1A, M2A, M1B, M2B) coupled to the voltage boost capacitive circuitry (C1A, C1B, C2A, C2B) to transfer thereon said voltage-pumped (100A, vbl_boost) replica of the comparison signal (COMP_OUT), wherein the first (12A) and second (12B) drivers are controllably (PA_LV, PB_LV) switchable between a first mode of operation during which the current flow path through the least one driver transistor (MDRV_1A, MCASC_2A, MDRV_1B, MCASC_2B) is conductive or non-conductive in response to the voltage-pumped (100A; vbl_boost) replica of said comparison signal (COMP_OUT) having the first respective logical value or the second respective logical value and the voltage refresh transistor circuitry (M1A, M2A, M1B, M2B) is de-activated (OFF), and a second mode of operation during which the voltage refresh transistor circuitry (M1A, M2A, M1B, M2B) coupled to the voltage boost capacitive circuitry (C1A, C1B, C2A, C2B) is activated (ON) to transfer thereon said voltage-pumped (100A; vbl_boost) replica of the comparison signal (COMP_OUT), and the current flow path through the least one driver transistor (MDRV_1A, MCASC_2A, MDRV_1B, MCASC_2B) is non-conductive.

The circuit may include mode control circuitry (100A) configured (PA_LV, PB_LV) to alternately switch the first (12A) and second (12B) drivers between a first operating condition wherein the first driver (12A) may be in the first mode of operation and the second driver (12B) may be in the second mode of operation, and a second operating condition wherein the first driver (12A) may be in the second mode of operation and the second driver (12B) may be in the first mode of operation.

The mode control circuitry (100A) may be configured (PA_LV, PB_LV) to switch the first (12A) and second (12B) drivers to a transition operating condition wherein both the first driver (12A) and the second driver (12B) may be in the first mode of operation.

Each of the first (12A) and second (12B) drivers may include a current flow line between a supply node (vcc) and the output node (vout) may include the cascaded arrangement of current flow paths through a first driver transistor (MDRV_1A, MDRV_1B) having the current flow path therethrough coupled to the output node (vout), and a second driver transistor (MCASC_2A, MCASC_2B) arranged with the current flow path therethrough between the supply node (vcc) and the first driver transistor (MDRV_1A, MDRV_1B).

The first driver transistor (MDRV_1A, MDRV_1B) and the second driver transistor (MCASC_2A, MCASC_2B) may be low-voltage and high-voltage transistors, respectively.

The circuit may include mode control circuitry (100A) configured (EN) to switch the first (12A) and second (12B) drivers to an off condition wherein the output node (vout) may be grounded and the second driver transistor (MCASC_2A, MCASC_2B) in both the first (12A) and second (12B) drivers may be non-conductive.

Each of the first (12A) and second (12B) drivers may include a circuit node (A1, A2) configured (N1, N2) to have applied thereto the comparison signal (COMP_OUT), first (C1A, C2A) and second (C1B, C2B) voltage boost capacitors arranged with said circuit node (A1, A2) intermediate therebetween, a first voltage refresh transistor (M1A, M1B) having a current flow path therethrough arranged between the first voltage boost capacitor (C1A, C2A) and the output node (vout), and a second voltage refresh transistor (M2A, M2B) having a current flow path therethrough arranged between the second boost capacitor (C1B, C2B) and a boosted voltage supply node (vbl_boost).

Each of the first (12A) and second (12B) drivers may include the first driver transistor (MDRV_1A, MDRV_1B) having a control terminal coupled to the current flow path through the first refresh transistor (M1A, M1B) between (B1, B2) the first refresh transistor (M1A, M1B) and the first voltage boost capacitor (C1A, C2A); and the second driver transistor (MCASC_2A, MCASC_2B) having a control terminal coupled to the current flow path through the second refresh transistor (M2A, M2B) between (C1, C2) the second refresh transistor (M2A, M2B) and the boosted voltage supply node (vbl_boost).

Each of the first (12A) and second (12B) drivers may include the control terminal of the second driver transistor (MCASC_2A, MCASC_2B) being coupled to the current flow path through the second refresh transistor (M2A, M2B) via a transistor switch (M3A, M4A, M3B, M4B) configured to be made non-conductive to decouple the control terminal of the second driver transistor (MCASC_2A, MCASC_2B) from the current flow path through the second refresh transistor (M2A, M2B) in response to the circuit being disabled (EN=0).

A device may be summarized as including a circuit, and an electrical load (Cload) coupled to said output node (vout) in the circuit to receive a regulated voltage therefrom.

A method of operating a circuit, or a device, the method may be summarized as including alternately switching (PA_LV, PB_LV) the first (12A) and second (12B) drivers between a first operating condition wherein the first driver (12A) is in the first mode of operation and the second driver (12B) is in the second mode of operation, and a second operating condition wherein the first driver (12A) is in the second mode of operation and the second driver (12B) is in the first mode of operation.

The method may include switching (PA_LV, PB_LV) the first (12A) and second (12B) drivers to a transition operating condition wherein both the first driver (12A) and the second driver (12B) may be in the first mode of operation.

Switching (PA_LV, PB_LV) the first (12A) and second (12B) drivers to said transition operating condition may include discontinuing the second mode of operation in one (12A, resp. 12B) of the first and second drivers de-activating the voltage refresh transistor circuitry (M1A, M2A, M1B, M2B) therein while maintaining the other (12B, resp. 12A) of the first and second drivers in the first mode of operation, wherein both of the first (12A) and second (12B) may be in the first mode of operation, and discontinuing the first mode of operation in the other (12A, resp. 12B) of the first and second drivers activating the voltage refresh transistor circuitry (M1A, M2A, M1B, M2B) therein.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A circuit, comprising:

an output node configured to apply an output voltage to a load;

an input comparator configured to:

compare a reference voltage with a first voltage that is a function of the output voltage; and produce a comparison signal having a first logical value or a second logical value based on an outcome of comparing the reference voltage with the first voltage; and driver circuitry coupled to the input comparator and configured to receive the comparison signal from the input comparator, the driver circuitry including:

first and second drivers coupled to the input comparator and configured to receive the comparison signal, each of the first and second drivers including:

at least one driver transistor having a conductive terminal coupled to the output node and a control terminal configured to receive a voltage-pumped replica of the comparison signal, wherein the replica of the comparison signal has a first respective logical value or a second respective second logical value based on the outcome of the comparing the reference voltage with the first voltage, wherein the least one driver transistor is conductive or non-conductive in response to the voltage-pumped replica of said comparison signal having the first respective logical value or the second respective logical value;

voltage boost capacitive circuitry configured to apply the voltage-pumped replica of the comparison signal to the control terminal of the at least one driver transistor; and voltage refresh transistor circuitry coupled to the voltage boost capacitive circuitry and configured to transfer the voltage-pumped replica of the comparison signal to the voltage boost capacitive circuitry, wherein the first and second drivers are controllably switchable between:

a first mode of operation during which the least one driver transistor is conductive or non-conductive in response to the voltage-pumped replica of the comparison signal having the first respective logical value or the second respective logical value and the voltage refresh transistor circuitry being deactivated, and a second mode of operation during which the voltage refresh transistor circuitry is activated to transfer the voltage-pumped replica of the comparison signal to the voltage boost capacitive circuitry, and the least one driver transistor is non-conductive.

2. The circuit of claim 1, comprising:

mode control circuitry configured to alternately switch the first and second drivers between:

a first operating condition in which the first driver is in the first mode of operation and the second driver is in the second mode of operation, and a second operating condition in which the first driver is in the second mode of operation and the second driver is in the first mode of operation.

3. The circuit of claim 2, wherein the mode control circuitry is configured to switch the first and second drivers to a transition operating condition in which both the first driver and the second driver are in the first mode of operation.

4. The circuit of claim 1, wherein each of the first and second drivers includes a current flow line between a supply node and the output node comprising a cascaded arrangement of current flow paths through:

a first driver transistor having the current flow path therethrough coupled to the output node, and a second driver transistor arranged with the current flow path therethrough between the supply node and the first driver transistor.

5. The circuit of claim 4, wherein the first driver transistor and the second driver transistor are low-voltage and high-voltage transistors, respectively.

6. The circuit of claim 4, comprising:

mode control circuitry configured to switch the first and second drivers to an off condition in which the output node is grounded and the second driver transistor of both the first and second drivers is non-conductive.

7. The circuit of claim 1, wherein each of the first and second drivers includes:

a circuit node configured to have applied thereto the comparison signal;

first and second voltage boost capacitors arranged with said circuit node intermediate therebetween;

a first voltage refresh transistor having a current flow path therethrough arranged between the first voltage boost capacitor and the output node; and a second voltage refresh transistor having a current flow path therethrough arranged between the second boost capacitor and a boosted voltage supply node.

8. The circuit of claim 7, wherein each of the first and second drivers includes:

a first driver transistor having a control terminal coupled to the current flow path through the first voltage refresh transistor between the first voltage refresh transistor and the first voltage boost capacitor; and a second driver transistor having a control terminal coupled to the current flow path through the second voltage refresh transistor between the second voltage refresh transistor and the boosted voltage supply node.

9. The circuit of claim 8, wherein in each of the first and second drivers the control terminal of the second driver transistor is coupled to the current flow path through the second voltage refresh transistor via a transistor switch configured to be made non-conductive to decouple the control terminal of the second driver transistor from the current flow path through the second voltage refresh transistor in response to the circuit being disabled.

10. A device comprising:

a circuit including:

an output node configured to apply an output voltage to a load;

an input comparator configured to:

compare a reference voltage with a first voltage that is a function of the output voltage; and produce a comparison signal having a first logical value or a second logical value based on an outcome of comparing the reference voltage with the first voltage; and driver circuitry coupled to the input comparator and configured to receive the comparison signal from the input comparator, the driver circuitry including:

first and second drivers coupled to the input comparator and configured to receive the comparison signal, each of the first and second drivers including:

at least one driver transistor having a conductive terminal coupled to the output node and a control terminal configured to receive a voltage-pumped replica of the comparison signal, wherein the replica of the comparison signal has a first respective logical value or a second respective second logical value based on the outcome of the comparing the reference voltage with the first voltage, wherein the least one driver transistor is conductive or non-conductive in response to the voltage-pumped replica of said comparison signal having the first respective logical value or the second respective logical value;

voltage boost capacitive circuitry configured to apply the voltage-pumped replica of the comparison signal to the control terminal of the at least one driver transistor; and voltage refresh transistor circuitry coupled to the voltage boost capacitive circuitry and configured to transfer the voltage-pumped replica of the comparison signal to the voltage boost capacitive circuitry, wherein the first and second drivers are controllably switchable between:

a first mode of operation during which the least one driver transistor is conductive or non-conductive in response to the voltage-pumped replica of the comparison signal having the first respective logical value or the second respective logical value and the voltage refresh transistor circuitry being deactivated, and a second mode of operation during which the voltage refresh transistor circuitry is activated to transfer the voltage-pumped replica of the comparison signal to the voltage boost capacitive circuitry, and the least one driver transistor is non-conductive; and an electrical load coupled to the output node and configured to receive a regulated voltage from the circuit.

11. The device of claim 10, wherein the circuit includes:

mode control circuitry configured to alternately switch the first and second drivers between:

a first operating condition in which the first driver is in the first mode of operation and the second driver is in the second mode of operation, and a second operating condition in which the first driver is in the second mode of operation and the second driver is in the first mode of operation.

12. The device of claim 11, wherein the mode control circuitry is configured to switch the first and second drivers to a transition operating condition in which both the first driver and the second driver are in the first mode of operation.

13. The device of claim 10, wherein each of the first and second drivers includes a current flow line between a supply node and the output node comprising a cascaded arrangement of current flow paths through:

a first driver transistor having the current flow path therethrough coupled to the output node, and a second driver transistor arranged with the current flow path therethrough between the supply node and the first driver transistor.

14. The device of claim 13, wherein the first driver transistor and the second driver transistor are low-voltage and high-voltage transistors, respectively.

15. The device of claim 13, wherein the circuit includes:

mode control circuitry configured to switch the first and second drivers to an off condition in which the output node is grounded and the second driver transistor of both the first and second drivers is non-conductive.

16. The device of claim 10, wherein each of the first and second drivers includes:

a circuit node configured to have applied thereto the comparison signal;

first and second voltage boost capacitors arranged with said circuit node intermediate therebetween;

a first voltage refresh transistor having a current flow path therethrough arranged between the first voltage boost capacitor and the output node; and a second voltage refresh transistor having a current flow path therethrough arranged between the second boost capacitor and a boosted voltage supply node.

17. A method, comprising:

comparing a reference voltage with a first voltage that is a function of an output voltage of a circuit;

producing a comparison signal having a first logical value or a second logical value based on an outcome of comparing the reference voltage with the first voltage;

generating a voltage-pumped replica of the comparison signal;

for each of first and second drivers, transferring, by voltage refresh transistor circuitry, the voltage-pumped replica of the comparison signal to a voltage boost capacitive circuitry, applying, by the voltage boost capacitive circuitry, the voltage-pumped replica of the comparison signal to a control terminal of at least one driver transistor; and controllably switching the first and second drivers between:

a first mode of operation during which the least one driver transistor is conductive or non-conductive in response to the voltage-pumped replica of the comparison signal having a first respective logical value or a second respective logical value and the voltage refresh transistor circuitry being deactivated, and a second mode of operation during which the voltage refresh transistor circuitry is activated to transfer the voltage-pumped replica of the comparison signal to the voltage boost capacitive circuitry, and the least one driver transistor is non-conductive.

18. The method of claim 17, wherein:

in a first operating condition, the first driver is in the first mode of operation and the second driver is in the second mode of operation, and in a second operating condition, the first driver is in the second mode of operation and the second driver is in the first mode of operation.

19. The method of claim 17, comprising:

switching the first and second drivers to a transition operating condition in which both the first driver and the second driver are in the first mode of operation.

20. The method of claim 19, wherein switching the first and second drivers to the transition operating condition includes:

discontinuing the second mode of operation in one of the first and second drivers and de-activating the voltage refresh transistor circuitry therein while maintaining the other of the first and second drivers in the first mode of operation, wherein both the first and second drivers are in the first mode of operation, and discontinuing the first mode of operation in the other of the first and second drivers and activating the voltage refresh transistor circuitry therein.

* * * * *